United States Patent [19]

Simmons

[11] 4,132,323
[45] Jan. 2, 1979

[54] COMBINATION TANK TRANSPORTER AND GENERAL CARGO TRAILER

[76] Inventor: Lovel R. Simmons, P.O. Box 1206, Jackson, Mich. 39205

[21] Appl. No.: 844,980

[22] Filed: Oct. 25, 1977

[51] Int. Cl.² .............................................. B60P 3/06
[52] U.S. Cl. ...................................... 214/85; 296/1 A
[58] Field of Search ................ 214/85, 85.1, 501; 296/1 A

[56] References Cited

U.S. PATENT DOCUMENTS

| | | | |
|---|---|---|---|
| 2,350,841 | 6/1944 | Troche et al. | 214/85.1 |
| 2,587,456 | 2/1952 | Francis | 296/1 A |

Primary Examiner—Robert G. Sheridan
Attorney, Agent, or Firm—Olson, Trexler, Wolters, Bushnell & Fosse, Ltd.

[57] ABSTRACT

The present invention is concerned with a trailer for carrying military tanks and convertible for carrying general cargo. The carrier is provided with a floor which has the rear portion raised about a front pivot for loading of tanks, which rear floor portion then is lowered about said front pivot to carrying position in order that the carrier might be stable with a tank in place and in order that the carrier and tank together might provide a low profile. A removable floor bolts in place for the carrying of general cargo.

11 Claims, 6 Drawing Figures

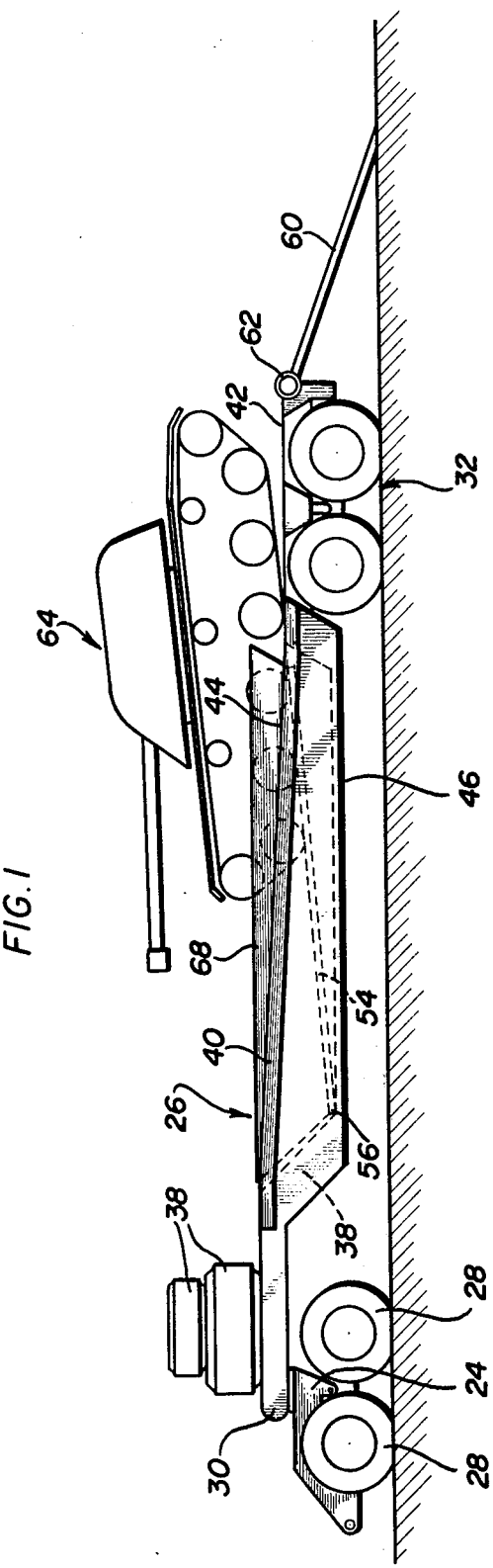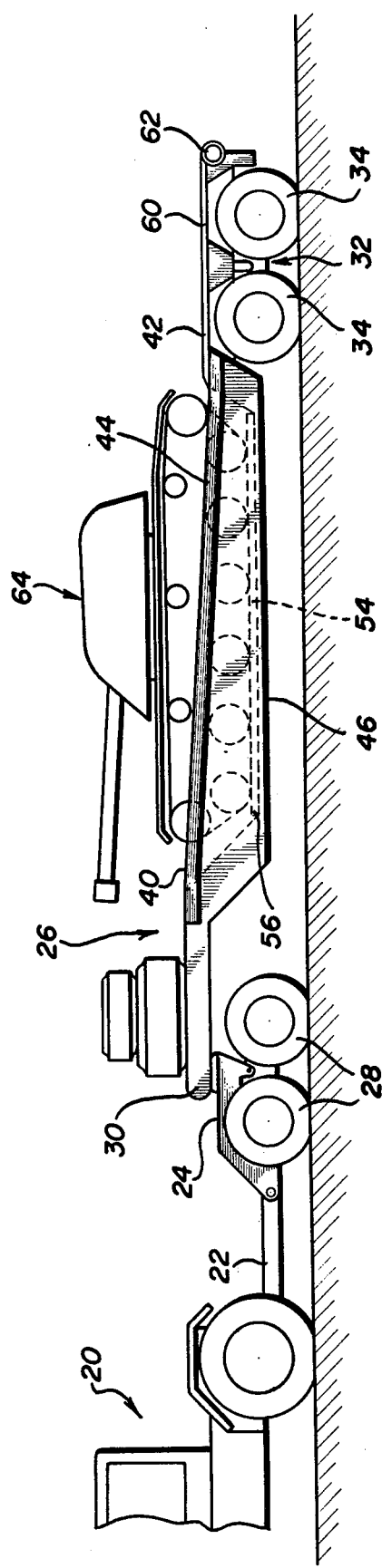

COMBINATION TANK TRANSPORTER AND GENERAL CARGO TRAILER

BACKGROUND OF THE DISCLOSURE

As is well-known military tanks move on caterpillar treads and are capable of moving over virgin terrain with no roads. However, the maximum speed of such tanks damages improved roads. Hence, to move tanks quickly to a scene where they are wanted when there are roads available, or when the terrain is sufficiently regular as to permit passage of wheeled vehicles, it is common practice to move tanks on wheeled carriers from one site to another. Such carriers heretofore have been of limited utility. A tank must move on to the trailer longitudinally of the trailer and from the rear thereof. This requires a tank to pass over the rear wheels and tires. It therefore is common practice to have the load supporting floor approximately above a level with the top portions of the trailer tires. This causes a tank to be carried too high, whereby it cannot pass under many overhead bridges, and wherein it presents a composite center of gravity that is much too high, resulting in an unstable structure.

As an alternative thereto the load supporting floor could be between the front and rear wheels of the trailer and lower than the top portions of the wheels and tires. This is disadvantageous in that a tank loaded over the rear wheels would reach a position of over balance and would suddenly drop forward on to the floor, damaging and perhaps rupturing the floor, and very likely also causing damage to the tank, bearing in mind the tremendous weight of a tank.

SUMMARY AND OBJECTS

Thus, it is broadly an object of the present invention to provide an improved combination tank transporter and general cargo trailer which will carry a tank at an elevation below the top of the wheels and tires of the trailer, thereby providing enhanced stability and greater overhead clearance.

It is further an object of the present invention to provide such a carrier which has a bolt-in floor for carrying general cargo.

In order to attain the foregoing object a trailer is provided which has front and rear sets of wheels. A transporting bed structure is provided longitudinally between the sets of wheels and generally at a level or slightly above the wheel axes. A pivoted ramp is provided at the rear of the trailer for a tank to run up under its own power. The tank runs across the tops of the wheels, simply resting on the tires while so doing, and runs on to the rear edge of a pair of floor structures. Each such floor structure is pivoted at the front and is hydraulically raised at the rear so that the tank passes directly on to the floors, each tread resting on a separate floor. After the tank has been completely run on to the floors the rear portions thereof are hydraulically lowered to carrying position, whereby the tank is at an overall low elevation to the trailer.

The lower elevation is further attained by a relatively thin floor. The floor (or pair of floors) is three to six inches thick, and normally would not be strong enough fully to support the weight of the tank during transport. However, each floor is provided with upstanding sheet steel sidewalls welded to the floor, and thereby greatly strengthening the floor vertically. Furthermore, the pivotal floor in carrying position rests upon an underlying floor forming a portion of the main structure of the trailer, whereby the pivoted floor is reinforced. The underlying floor is reinforced by upstanding sheet steel walls with channels welded therealong from end to end longitudinally of the trailer.

DRAWING DESCRIPTION

Other objects and advantages of the present invention and the structure for effecting the same will be readily understood with reference to the drawings and accompanying specification, wherein:

FIG. 1 comprises a side view of a trailer constructed in accordance with the present invention, the parts being shown in loading position;

FIG. 2 is a side view similar to FIG. 1 but showing parts in transporting position;

DETAILED DESCRIPTION

Figure 3:
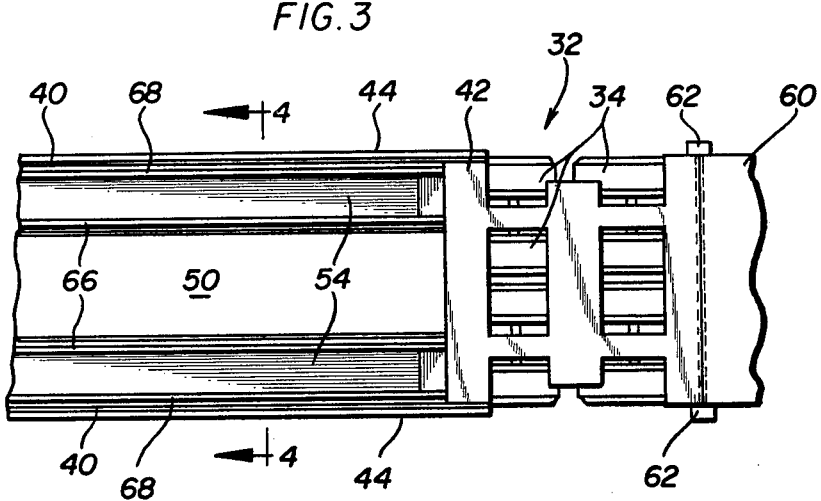
FIG. 3 is a fragmentary top view of the rear portion of the trailer.

Turning now to the drawings in greater particularity there is provided a tractor 20 of any suitable known construction having a drawbar 22 connected to the front carriage 24 of a trailer generally designated 26. The carriage 24 is provided with pneumatic tire wheels 28 in a known side by side and tandem arrangement, whereby as many as eight wheels and tires may be provided. The wheels preferably are of the type using low pressure tires with a relatively low number of plies, whereby the trailer may pass over many sorts of surfaces.

The trailer comprises a gooseneck 30 pivotally mounted on the carriage 24 in known fashion, and having suitable steel structure extending to the rear to a carriage 32 carrying in parallel and in tandem a total of eight wheels with low ply low pressure rubber tires 34 thereon. The wheels are arranged in pairs, there being one axle per pair, and tandem pairs being on a beam pivoted more or less amidships so that the wheels may oscillate relative to one another in passing over rough terrain, all as is well-known in the art.

The trailer 26 includes gooseneck 30 extending rearwardly from the fifth wheel or pivot, and spare tires and/or wheels 38 conveniently may be stored on top thereof. The gooseneck angles down at 38, and steel side plates 40 are welded thereto and to the rear structure 42. The side plates provide considerable reinforcement and are further provided with reinforcing channels 44 located near the upper edge thereof and running from front to back of the trailer. A main floor 46 extends transversely across the trailer and is welded to side plates 40 on either side, it being understood that the structure is symmetrical, whereby duplication of description is unnecessary. A central portion of the trailer structure comprises I-beams 48 with the lower flanges thereof welded to the floor 46 and with the upper flanges thereof welded to a sub-floor 50, this structure running from front to rear of the trailer. The ends of the sub-floor 50 and I-beams 48 have transverse plates (not shown) welded there across whereby to provide enclosed storage spaces 52 in which water or fuel may be transported.

Figure 4:
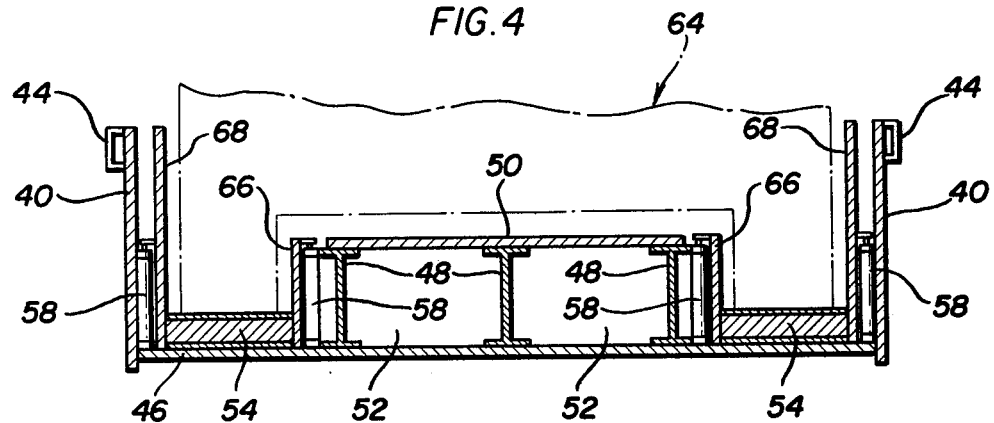
FIG. 4 is a cross sectional view taken generally along the lines 4—4 in FIG. 3, the parts being on an enlarged scale.

A pair of tank supporting floors 54 is respectively mounted generally adjacent the side plates 40. These floors are pivotally supported at their forward ends at 56 immediately above the floor 46. The floors 54 are of generally thin construction, being on the order of about three to six inches thick, and comprising upper and lower plates with honeycombed reinforcement welded between the plates in known manner. The tank supporting floors 54 are not strong enough to support a heavy military tank in passing over rough terrain simply of their own strength. However, they are reinforced by lying on the floor 46 in the lowered position of FIGS. 2 and 4. Hydraulic means such as cylinders and pistons 58 is provided near the rear of the floors 54, suitable reinforcements being provided to sustain the loads imposed, whereby the rear of these floors can be raised to the position of FIG. 1 substantially on a level with the tops of the plates 40 and the top of the rear structure 42.

A loading ramp 60 is provided at the rear of the rear structure 42 and is hydraulically controlled by means such as a hydraulic motor 62 for pivoting the ramp from diagonal, lowered loading position as shown in FIG. 1 to a raised traveling position as shown in FIG. 2. The exact traveling position is not of great importance and may be up and somewhat to the rear as shown in FIG. 2, or it may be any other suitable position.

When it is desired to load a vehicle such as a tank 64 on to the trailer 26 the loading ramp 60 is lowered as in FIG. 1, while the floors 54 are raised to the inclined position of FIG. 1. The tank 64 is then driven up the ramp 60 under its own power, across the rear structure 42 and tires 34 on to the inclined floors 54. Each floor 54 is provided along an inner edge with a wall 66 welded to the floor and extending up as far as possible, but low enough that it will be cleared by the tank with the treads thereof on the floors 54. Each floor also is provided with a welded outside wall 68 of greater height, since these walls lie outside of the tank structure entirely. The walls 66 and 68 run from front to rear of the floors 54 and impart a very substantial strength and rigidity to the floors. Hence, the floors, which are thinner than normally would be used for transporting tanks over rough terrain are strong enough for the intended job.

After the tank has passed completely on to the floors 54 the rear ends thereof are lowered hydraulically so that the tank may be carried in the position shown in FIG. 2. At substantially the same time the hydraulic loading ramp 60, which may be a single ramp, or a pair of ramps, is raised to traveling position as in FIG. 2.

Figure 5:
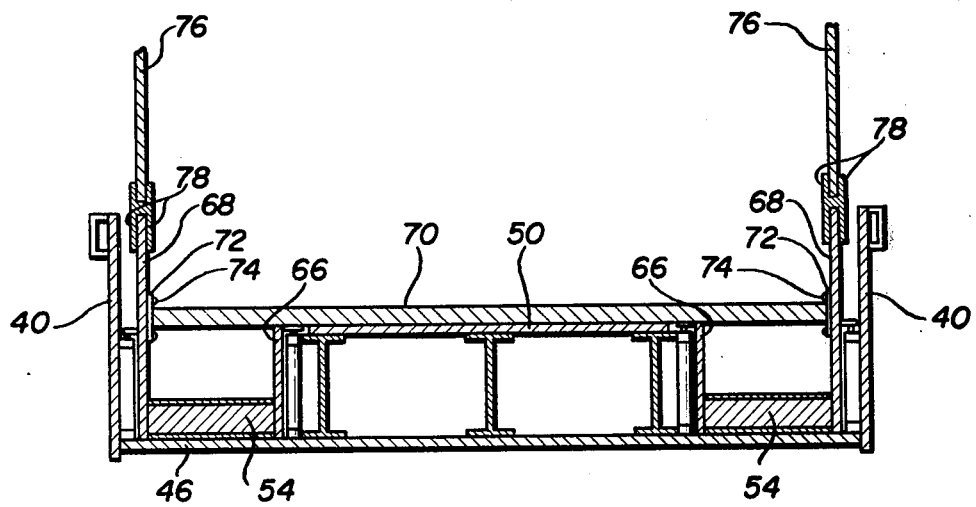
FIG. 5 is a view similar to FIG. 4 showing modification.
Figure 6:
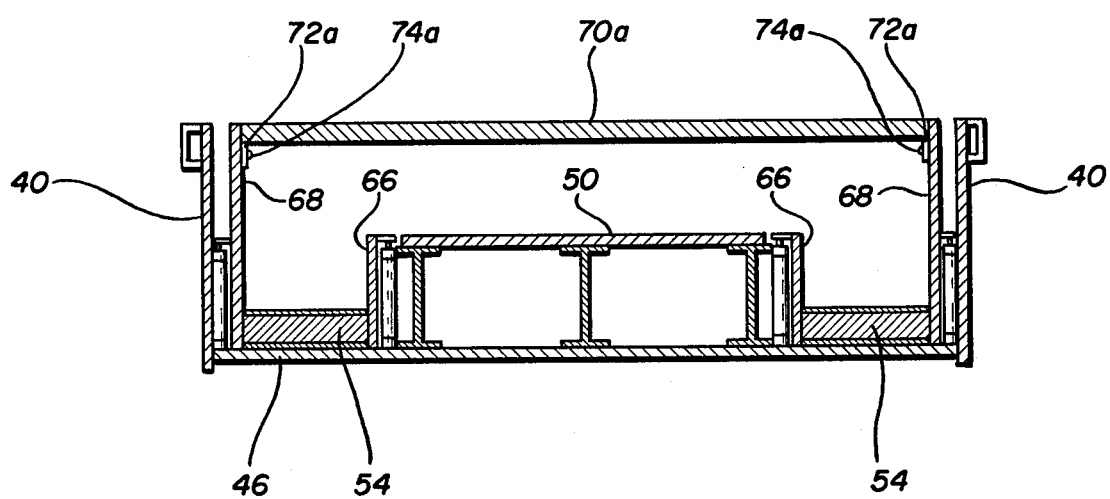
FIG. 6 shows another modification.

Although reference has been made primarily to the carrying of a tank, it is apparent that other types of vehicles could be carried. In order to render the trailer more versatile for military use, and also to make it completely useful for peace time uses it is readily converted to a general cargo carrier. Thus, as shown in FIG. 5 there is a removable floor 70 which rests on top of the sub-floor 50 and also on the top edges of the sidewalls or plates 66 of the tank carrying floors 54. Suitable flanges are provided at opposite ends thereof at 72 for bolting the floor 70 to the outside walls or plate 68 as at 74. In addition auxiliary sidewalls 76 are received on top of the walls 68 for such general cargo carrying. The walls 76 are provided with depending spaced side plates 78 which lie on opposite sides of the walls 68 adjacent to tops thereof. Bolts may be passed through the side plates 78 and tops of the walls 68 for more securely mounting the auxiliary, removable side plates 76 in position on top of the side plates 68. With the addition of the removable floor 70 and the removable side plates or walls 76 the trailer becomes a general cargo trailer. A further modification is shown in FIG. 6. This is generally similar to FIG. 5, but the removable floor 70a is provided at the top surface thereof on a line with the top edges of walls or plates 40 and 68. Depending flanges 72a and bolts 74a may secure the floor in this position, and supports (not shown) may be provided between the floor 70a and the sub-floor 50 to provide extra support. This provides clearance for carrying of containerized cargo which often is too wide to fit down between the walls 40.

The specific example of the invention as herein shown and described is for illustrative purposes only. Various changes in structure will no doubt occur to those skilled in the art, and will be understood as forming a part of the present invention insofar as they fall within the spirit and scope of the appended claims.

The invention is claimed as follows:

1. A wheeled transporter for a vehicle such as a tank comprising elongated frame means, wheel means at the front end thereof and wheel means at the rear end thereof disposed for engagement with a supporting surface for movement of said transporter along said supporting surface, ramp means at one end of said frame means and having a diagonal position in which said ramp means is inclined substantially from said supporting surface up to said frame means at a level adjacent the top of the wheel means adjacent one end of said frame means, floor means, pivot means pivotally securing said floor means adjacent one end thereof to said frame means relatively adjacent to the end of said frame means opposite to said ramp means, said pivot being at a level below the aforesaid level adjacent the top of said wheel means, and means for pivoting said floor means between traveling position with said floor means substantially horizontal and vehicle-loading position with said floor means in inclined position with the end thereof remote from said pivot means and relatively adjacent said ramp means substantially at the aforesaid level.

2. A transporter as set forth in claim 1 wherein said floor means comprises a pair of floors spaced transversely of said elongated frame means.

3. A transporter as set forth in claim 2 wherein said frame means includes a center box section having the top thereof at about said level.

4. A wheeled transporter as set forth in claim 1 and further including a sub-floor, said floor means resting on said sub-floor and being reinforced thereby in traveling position.

5. A transporter as set forth in claim 4 wherein said floor means comprises a pair of spaced floors.

6. A transporter as set forth in claim 5 wherein said frame means includes a center box section intermediate said floors.

7. A transporter as set forth in claim 1 and further including reinforcing plates secured along opposite longitudinal edges of said floor means.

8. A transporter as set forth in claim 7 wherein said floor means comprises a pair of spaced floors.

9. A transporter as set forth in claim 8 wherein said frame means comprises a center box section intermediate said floors and with the top thereof substantially at about said level, the reinforcing plates adjacent said box section extending upwards substantially to the top of said box section.

10. A transporter as set forth in claim 9 and further including a removable floor securable to said frame means above said floor means.

11. A transporter as set forth in claim 10 wherein said frame means includes a center box section having the top thereof at about said level, said removable floor resting on the top of said box section.

* * * * *